United States Patent [19]

Sabot

[11] Patent Number: 5,033,409

[45] Date of Patent: Jul. 23, 1991

[54] DOG EXERCISING DEVICE

[76] Inventor: Jay Sabot, 43 Peach Farm Rd., Oxford, Conn. 06483

[21] Appl. No.: 562,107

[22] Filed: Aug. 1, 1990

[51] Int. Cl.$^5$ .............................................. A01K 15/00
[52] U.S. Cl. .................................... 119/29; 280/288.4; 280/292
[58] Field of Search ........................... 119/29, 96, 109; 280/288.4, 292

[56] References Cited

U.S. PATENT DOCUMENTS

| 2,630,334 | 3/1953 | Ewers | 280/288.4 |
| 2,672,351 | 3/1954 | Kane | 280/288.4 |
| 3,222,034 | 12/1965 | Jackson | 280/288.4 X |
| 4,134,364 | 1/1979 | Boncela | 119/29 |

Primary Examiner—Gene Mancene
Assistant Examiner—R. Thomas Price
Attorney, Agent, or Firm—Edward R. Hyde

[57] ABSTRACT

A device for exercising a dog from a bicycle which includes a triangular framework secured to the bicycle. The device is conveniently attachable to the bicycle and adjustable to fit bicycles of various sizes and construction.

7 Claims, 3 Drawing Sheets

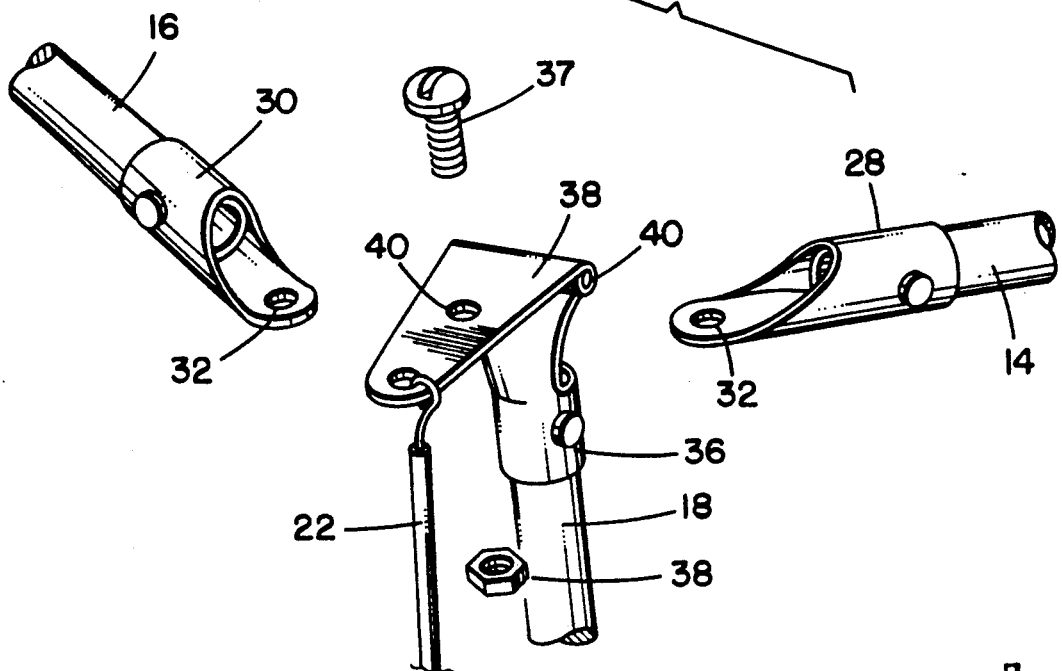
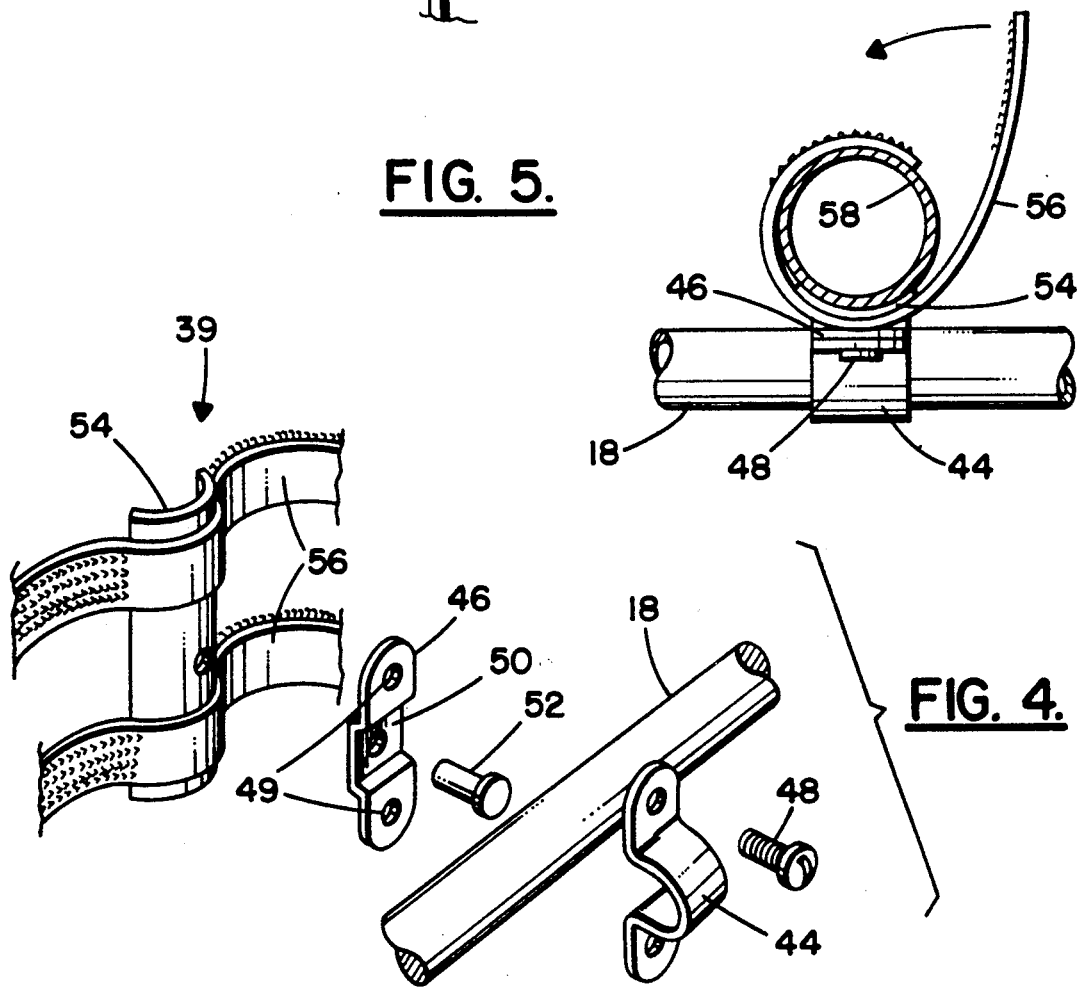

DOG EXERCISING DEVICE

BACKGROUND OF THE INVENTION

1. Field of the Invention:

The present invention relates to apparatus for exercising a dog while riding a bicycle. The apparatus comprises a dog tethering device that is secured to the bicycle and extends out to one side. The dog is on a leash that attaches to the device.

Although tethering devices for exercising dogs while riding a bicycle are known, a problem has been the provision of a device that will readily adapt to bicycles of various sizes and designs. Another problem with such devices of the prior art is that they are not readily and quickly attachable and detachable to the bicycle.

The present invention provides a dog tethering device that will adapt to a wide range of bicycle sizes and designs and is conveniently and quickly attached to the bicycle.

2. Description of the prior art:

Prior art bicycle tethering devices are shown in U.S. Pat. Nos. 4,134,364 of Bonceia and 4,854,269 of Arntzen. The former patent describes a structure in which a single bar member is bolted to a bicycle frame and extends outward to a releasable leash mechanism. The device includes a clamp assembly that bolts to the bicycle frame. This type of device lacks the flexibility of attachment to bicycles of different designs and sizes and in addition does not have a mechanism for quickly and readily attaching and detaching to the bicycle. The patent of Arntzen is directed to a device which adjusts to the movement of the dog.

SUMMARY OF THE INVENTION

Against the foregoing background, it is a primary object of the invention to provide a dog tethering device which is conveniently secured to a bicycle frame and which extends outwardly from the bicycle for exercising a leashed dog.

It is another object of the present invention to provide a dog exercising device that is adjustable to be secured to bicycles of various designs and sizes and to be readily and conveniently attached and detached to the bicycle.

It is a still further object of the present invention to provide a dog exercising device of a structure that when secured to a bicycle is strong and rigid to provide a safe reliable framework for tethering the dog.

A pyramidal or tetrahedral structure of minimum bulk and light weight is provided. When attached to a bicycle it provides a rigid structure which extends out to one side of the bicycle. It does not obstruct the rider's operation of the bicycle so that he can steer and pedal in the normal manner.

BRIEF DESCRIPTION OF THE DRAWINGS

The foregoing and still other objects and advantages of the present invention will be more apparent from the following detailed explanation of the preferred embodiments of the invention in connection with the accompanying drawings herein in which:

FIG. 3 is an exploded view of the junction assembly of the device;

FIG. 4 is an exploded view of the clamping mechanism at the end of a frame member that joins to the bicycle frame;

FIG. 5 illustrates the end of a frame member secured to a bicycle;

DESCRIPTION OF THE PREFERRED EMBODIMENT

Figure 1:
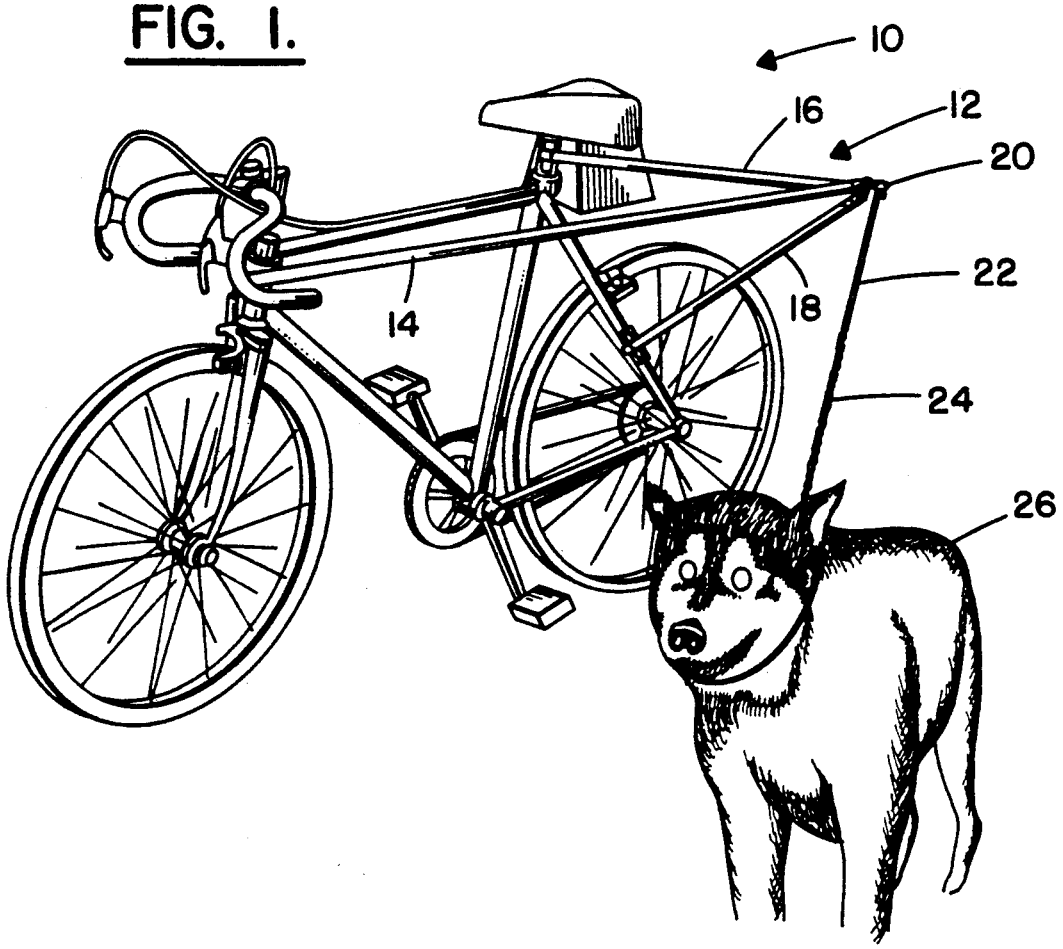
FIG. 1 is a perspective view of the dog exercising device mounted to the left side of a bicycle.

Referring now to the drawings and more particularly to FIG. 1, there is shown a bicycle 10 of conventional construction. The tethering device 12 of the present invention comprises three bars 14, 16, 18 which are preferably of tubular construction and of a light weight metal such as an aluminum alloy. As hereinafter described in more detail, one end of each of the bars is secured to appropriate locations on the frame of bicycle 10 and the other end of each of the bars are joined as at 20, a distance off to one side of the bicycle. An elastic member such as a bungee cord is secured to the joined ends of the bars 14, 16, 18 and is adapted to receive a dog's leash 24 to secure the dog 26 to the bicycle and under control of the rider.

Figure 2:
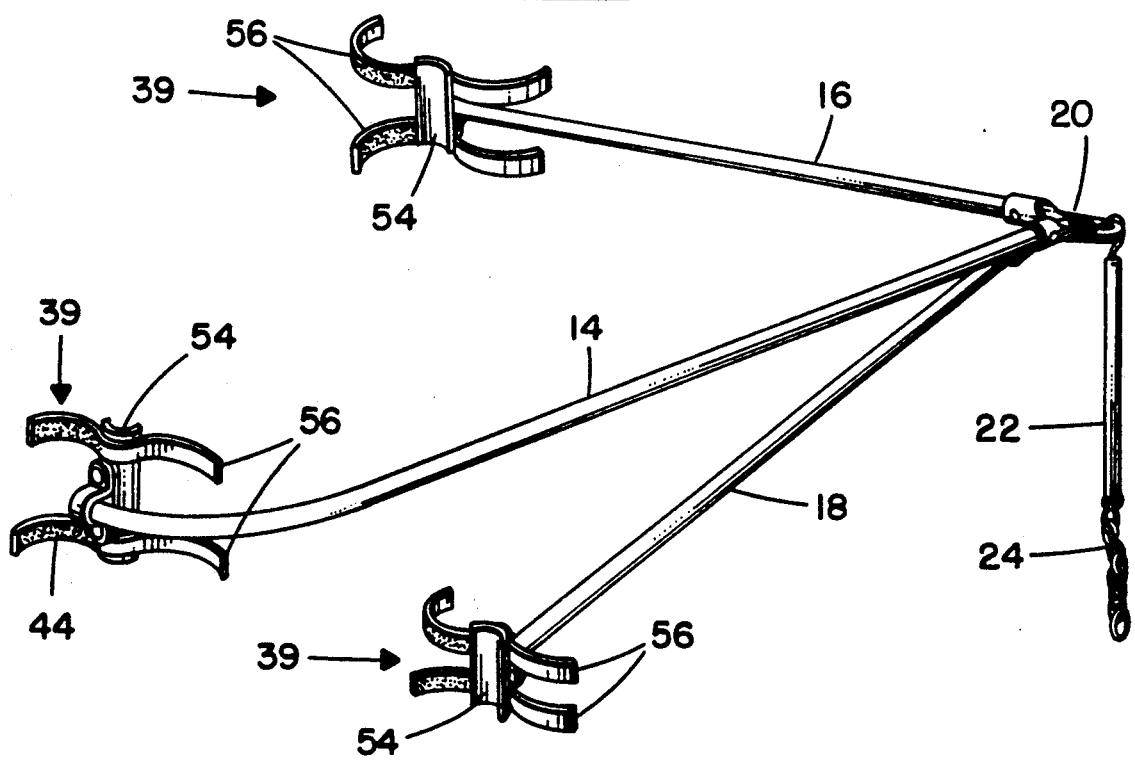
FIG. 2 is a perspective view of the exercising device.

It is seen that a rigid triangular framework is provided in which the three bars are joined at the apex 20 of a pyramidal or tetrahedral structure. Referring now to FIGS. 2 and 3, bars 14, 16 each have an extension 28 and 30 respectively which may be secured to the bars as by rivets or other convenient means. The outer end of each extension 28, 30 has a hole 32, drilled therein to provide pivoting movement for the bars.

Bar 18 terminates in an extension 36 having a hinge element 38 and hinge pivot pin 40 as shown in FIG. 3. The hinge plate 38 has a hole 49 which, when the ends of the three bars are appropriately aligned, will be aligned with drilled holes 32, and which receive a machine screw 37 held in place by a nut 38. It is seen that when the outer ends of bars 14, 16, 18 are brought together and held in place by machine screw 37 the included angle between any two of the bars is adjustable by means of bars 14 and 16 pivoting around machine screw 37 and bar 18 pivoting around hinge pin 40.

Each of the bars has a clamping mechanism 39 toward the outer end thereof and shown in detail in FIG. 4. The mechanism includes a U-bracket 44 and strap 46 adapted to be held together by any suitable means such as a pair of machine screws one of which is shown as 48. The screws 48 are received in threaded holes 49 in strap 46. The U-bracket surrounds the bar 18 and is held in place by strap 46 which has an offset 50 to receive the head of a rivet 52 that passes through the strap and through a clamp element 54 which is formed as a portion of a cylinder and is adapted to fit against a frame member of the bicycle. The bracket has secured thereto a pair of straps 56 which may be of Velcro material. The straps are glued or cemented to the outer surface of the clamp 54.

Referring now to FIG. 5, there is shown the clamping mechanism secured to a bicycle frame member 58. The inner surface of clap 54 fits against the bicycle frame member 58 and the strap 56 surrounds the frame member 58 to hold the mechanism securely in place.

The adjustability features of the securing mechanism should be especially noted. In addition to the angular adjustability of the three bars 14, 16, 18, each clamping mechanism 39 is slidable along its associated tubular bar and also may be pivoted or rotated around the bar. In addition the clamp 54 is pivotal about pin 52. This arrangement permits the clamp 54 to assume any desired position so that it can be fitted against the bicycle frame member to which it is to be secured. When the clamp 54 is properly oriented, the machine screws 48 are tightened to secure it in place on its respectful bar. In the assembly shown in FIG. 1, it is seen that the bar 18 secures to one arm of the rear bicycle fork and the end of bar 14 is secured to the post of the front fork. Bar 16 is secured to the bicycle at the seat post but it is understood that the inner ends of the bars may be secured to any convenient locations of the bicycle frame.

Optionally bar 14 may be curved at its inner end as more clearly shown in FIG. 2 to insure complete freedom of pedaling for the rider.

Figure 6:
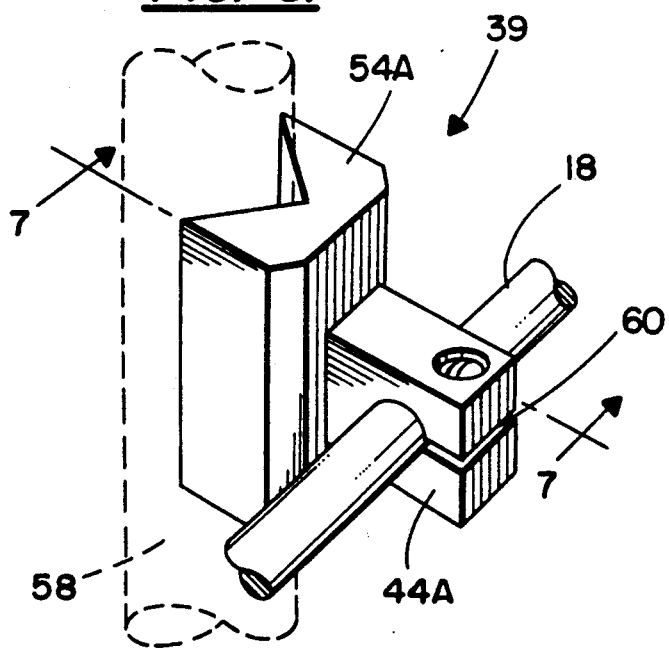
FIG. 6 is a perspective view of a modification of the clamping mechanism of FIG. 4.
Figure 7:
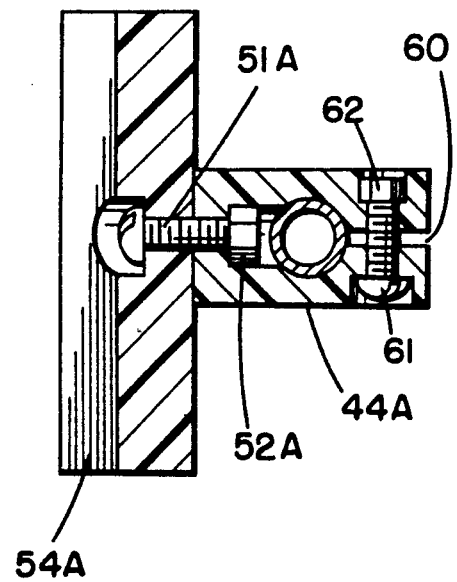
FIG. 7 is a cross-section taken of the line 7—7 of FIG. 6.

Referring now to FIGS. 6 and 7, there is shown a clamping mechanism 39A that is an alternative to mechanism 39 of FIG. 4. In this embodiment a V-block 54A replaces the cylindrically curved clamp 54. The V configuration permits the accommodation of a wide range of diameter of bicycle frame members such as member 58. The angle of the V may vary widely and 90° has been found to be one suitable angle.

The V-block clamp 54A is pivotally secured to bracket 44A by machine screw 51A and nut 52A. The bracket 44A is split as at 60 and has a cylindrical hole passing therethrough to receive its associated bar 18. A machine screw 61 and nut 62 passes through the split end of bracket 44A and serves to clamp the mechanism in place on the associated bar 18. The V-Block 54A and bracket 44A may be of polyurethane or other suitable material.

Having thus described the invention with particular reference to the preferred forms thereof, it will be obvious that various changes and modifications may be made therein without departing from the spirit and scope of the invention as defined in the appended claims.

What is claimed is:

1. A device adapted to secure to a bicycle and extend outward from one side thereof for exercising a dog comprising:
   three rigid, elongated members;
   a first end of each of said three members being joined together;
   securing means to receive the three joined first ends of said members;
   said securing means being adjustable whereby said members are pivotally secured together and an included angle between any two members may be varied;
   clamping mechanism secured to the second end of each of said three members and being slidable along the associated member;
   each said clamping mechanism being adapted to be received by a bicycle frame member; and
   releasable means to secure each clamping mechanism to a bicycle frame member.

2. The device set forth in claim 1 in which said securing means includes pivoting means.

3. The device set forth in claim 2 in which said securing means further includes hinge means.

4. The device as set forth in claim 1 in which the clamping mechanism includes a bracket means slidable along the associated elongated member;
   clamp means pivotally secured to the bracket means, said clamp means having a cylindrical curve to fit against a frame member of a bicycle and strap means secured to the clamp means to hold the clamping mechanism in place on a bicycle frame member.

5. A device adapted to be attached to a bicycle at one side thereof for exercising a dog comprising:
   three rigid, elongated members;
   pivoting means joining one end of each of said elongated members together;
   said pivoting means including hinge means whereby the three joined elongated members are each pivotable with respect to the others;
   clamping mechanism slidably mounted to the other end of each of said elongated members;
   each of said clamping mechanism including bracket means adapted to slide along the associated elongated member;
   clamp means adapted to fit against a frame member of a bicycle;
   said clamp means being pivotally secured to said bracket means; and
   strap means secured to said clamp means to hold the clamp means in place against the frame member of a bicycle.

6. The device set forth in claim 5 in which the clamp means has a cylindrical curve to fit against the frame member of a bicycle.

7. The device as set forth in claim 5 in which the clamp means has a V-groove to fit against the frame member of a bicycle.

* * * * *